(12) United States Patent
Fetters

(10) Patent No.: US 7,165,337 B1
(45) Date of Patent: Jan. 23, 2007

(54) ALIGNMENT DEVICE AND METHOD FOR MEASURING WHEEL BASE ON VEHICLES

(76) Inventor: Alan Fetters, 11725 Garland Rd., Laura, OH (US) 45337

( * ) Notice: Subject to any disclaimer, the term of this patent is extended or adjusted under 35 U.S.C. 154(b) by 141 days.

(21) Appl. No.: 10/905,918

(22) Filed: Jan. 26, 2005

(51) Int. Cl.
G01D 21/00 (2006.01)

(52) U.S. Cl. .............................. 33/608; 33/600; 33/644; 33/203.18

(58) Field of Classification Search ................. 33/608, 33/227, 203.18, 600, 644–645, 288
See application file for complete search history.

(56) References Cited

U.S. PATENT DOCUMENTS

| | | | |
|---|---|---|---|
| 3,983,635 A | 10/1976 | Jarman | 33/288 |
| 4,098,003 A | 7/1978 | Negrin | 33/288 |
| 4,106,208 A * | 8/1978 | Hunter | 33/203.18 |
| 4,236,315 A * | 12/1980 | Curchod et al. | 33/203.18 |
| 5,046,756 A | 9/1991 | Hertrick | 280/718 |
| 5,084,979 A * | 2/1992 | Brosher et al. | 33/203.18 |
| 5,589,927 A | 12/1996 | Corghi | 356/3.12 |
| 6,823,246 B1 | 11/2004 | Jackson et al. | 701/36 |
| 2006/0107538 A1* | 5/2006 | Harrill | 33/203.18 |

* cited by examiner

Primary Examiner—Yaritza Guadalupe-McCall
(74) Attorney, Agent, or Firm—R. William Graham

(57) ABSTRACT

An alignment device for measuring wheel base on a vehicle having a first axle and determining squareness thereof, the device includes at least one clamp removably clampable to the first axle and an alignment bar operably associated with said clamp in manner such that said alignment bar extends substantially in parallel alignment with a central axis of the first axle.

20 Claims, 4 Drawing Sheets

ALIGNMENT DEVICE AND METHOD FOR MEASURING WHEEL BASE ON VEHICLES

BACKGROUND OF THE INVENTION

1. Field of Invention

The present invention relates to an alignment device for measuring wheelbase on vehicles. More particularly, the invention is directed to a simple and easy mechanical device for measuring wheelbase on a vehicle.

2. Prior Art

There exist a variety of automobile frame, wheel base and axle alignment devices. Examples of devices include mechanical means as well as computer based means to determine whether there was proper alignment of the vehicle. Prior mechanical means do not provide a quick and easy way of measuring wheelbase. For example, one prior device utilizes a relatively expensive carriage system which must be disposed beneath the vehicle. Another system requires suspending multiple tubes via chains from a frame in a transverse manner to check frame alignment. Other systems employ expensive computerized equipment and lasers or LED's to gain wheel base measurement and/or electromechanical means with sensors attached to predetermined frame positions relative to the wheel base wherein a computer calculates the wheel base so that an adjustment can be made.

While there exist such systems, there remains a need to provide a tool, which can be used on a variety of vehicles, which can accurately, inexpensively and quickly be employed by a mechanic in order to measure wheelbase. Such a tool enables small body shops and individuals who build and repair race and street vehicles and with budget concerns to effectively work on wheel base adjustment.

SUMMARY OF THE INVENTION

It is an object to improve wheel base measurement on a vehicle by providing a method and device for determining whether the wheelbase is in square.

It is another object to simplify wheel base measurement on a vehicle.

A further object is to ease the process of measuring wheelbase on a vehicle and determining squareness of the of the same.

Still another object is to provide for an inexpensive tool for measuring wheelbase on a vehicle and device for determining whether the wheelbase is in square.

Accordingly the present invention is directed to an alignment device for measuring wheelbase on vehicles. The device includes at least one clamp, and in a preferred embodiment, two clamps, which can removably clamp to a first axle housing, such as a rear axle housing, of a vehicle. A bar is connected to the clamp in a manner such that it extends normal to the axle housing. To this bar is connected at least one bracket having a second bar connected thereto which extends substantially in parallel alignment with a central axis of the first axle housing. The second bar is preferably long enough to extend outside a body of the vehicle. With this device in place, the user can then mark a common distance on each exposed end of the second bar taken from each end of the first axle housing, such as a flange thereof. Now, employing a simple measuring tool, such as a measuring tape or measuring laser, one can measure from each mark to a respective point, such a flange, of the front wheel base components.

DETAILED DESCRIPTION OF THE PREFERRED EMBODIMENT

Figure 1:
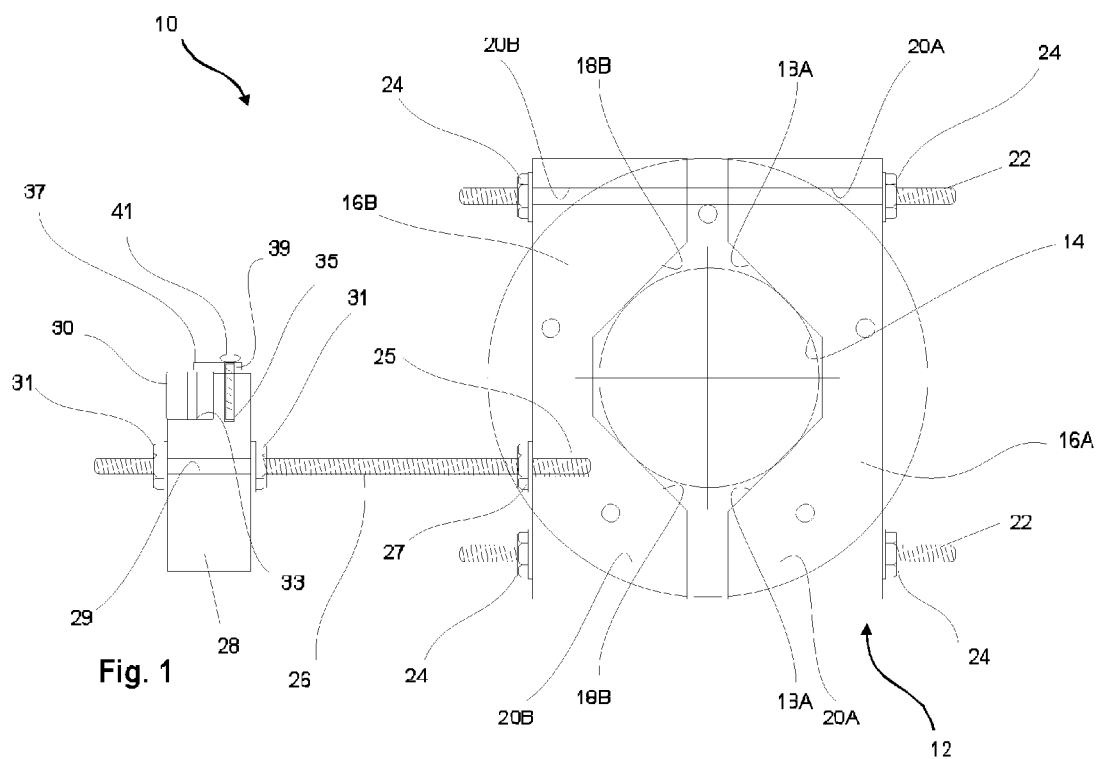
FIG. 1 is a side view of the device of the present invention disposed about an axle housing.
Figure 2:
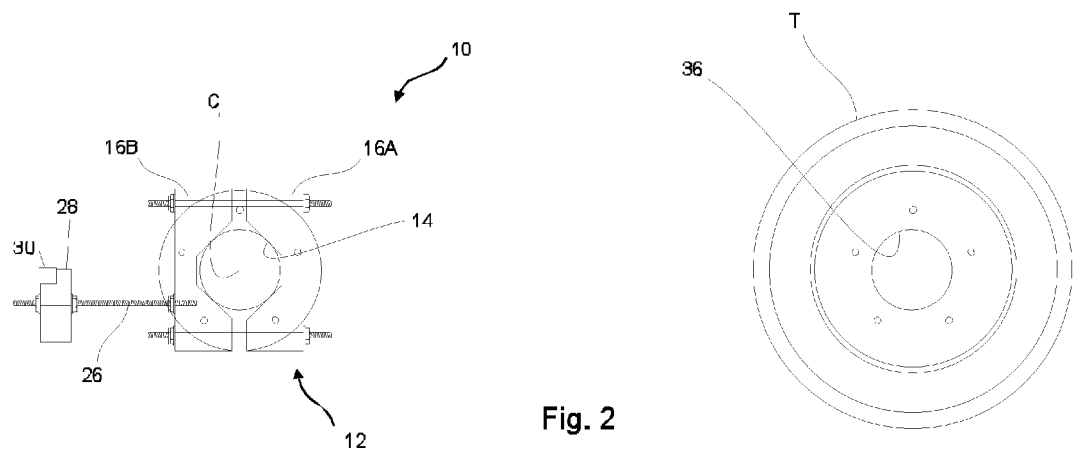
FIG. 2 is another side view of the device of the present invention relative to axle housings.

Referring now to the drawings, the alignment device for measuring wheelbase on vehicles of the present invention is generally designated by the numeral 10. The device 10 is shown to include clamp 12 which can removably clamp to a first axle housing 14, such as a rear axle housing, of a vehicle V. While there are two clamps 12 depicted, it is contemplated that one or more may be employed as required to carry out the invention. Each clamp 12 can preferably includes a pair of opposing members 16a and 16b wherein each member includes a pair of opposing generally flat faces 18a and 18b, respectively, which provide and ability to clamp various diameter axle housings and are angled with respect to one another generally forming a V-shape to provide for various sized axle housing radius and a self centering capability as they are drawn into contact with the axle housing 14. The clamp 12 is thus able to be set at a normal position with respect to the axle housing 14. When the members 16a and 16b are disposed adjacent one another such that the faces 18a and 18b oppose one another, openings 20a and 20b of members 16a and 16b, respectively, are coaxially aligned and receive a threaded bar 22 therethrough to enable the opening and closing of the clamp 12. The threaded bar 22 can be connected with nuts 24 to aid in securing each threaded bar 22 with respect to the members 16a and 16b. It is recognized that there are a variety of ways to interconnect the clamp members 16a and 16b, such as a slide bar with a spring stop.

Figure 3:
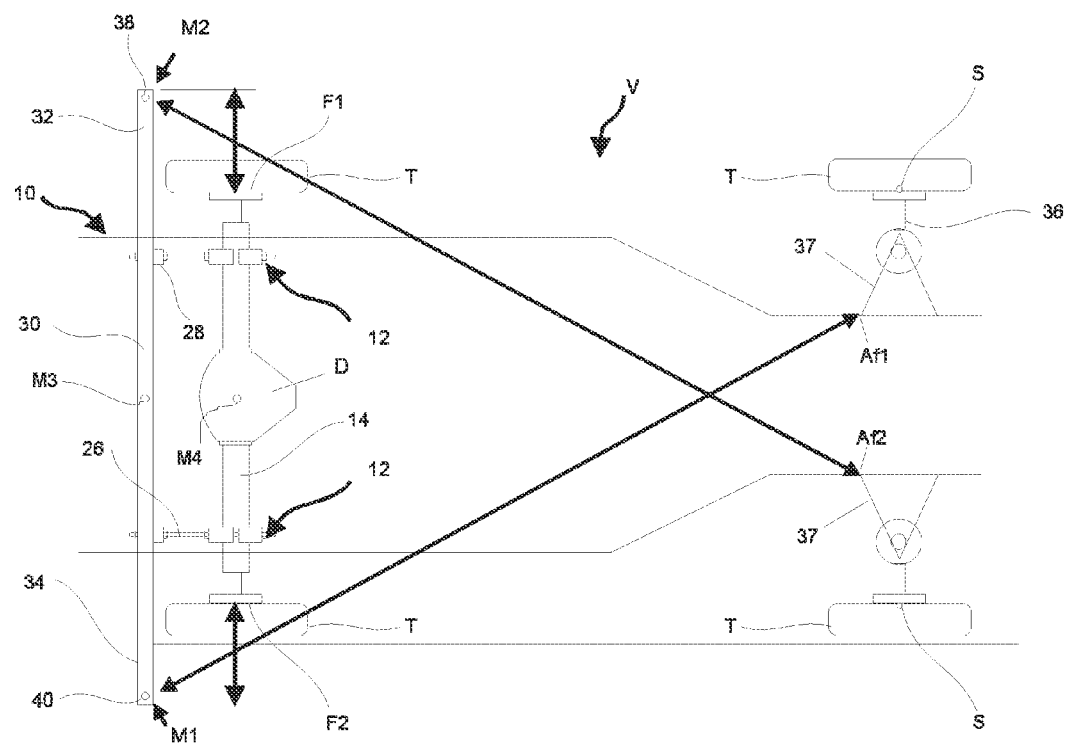
FIG. 3 is a top view of the device of the invention employed about an axle of a vehicle.

Connected to the member 16b via a threaded opening 25 and nut 27 is a spacer bar 26 is connected to the clamp 12. Likewise, the spacer bar 26 extends normal to the axle housing 14. To this spacer bar 26 is connected a bracket 28. The spacer bar 26 can preferably be slidably adjustably fixably connected to the bracket 28 via passing the bar 26 through opening 29 and fixing the bracket 28 in place using threaded nuts 31. In this regard, the bracket 28 can be moved to achieve clearance needed from surrounding parts, such as a differential housing D as depicted in FIG. 3.

An alignment bar 30 is connected to the bracket 28 such that it extends substantially in parallel alignment with a central axis C of the axle housing 14. The alignment bar 30 is preferably long enough to extend outside tires T and body of the vehicle V. Similarly, the alignment bar 30 can preferably be slidably adjustably fixably connected to a bar receiving portion 33 of the bracket 28. When seated in the bar receiving portion 33, the alignment bar 30 extends slightly above the surface of the bracket 28 as illustrated in FIG. 1. The bracket 28 includes a threaded open surface 35 and a locking plate 37 having a bore 39 therethrough receive a threaded threaded bolt 41, which tightens to lock the alignment bar 30 to the receiving surface portion 33.

With the device 10 in place such that the alignment bar 30 extends substantially in parallel alignment with a central axis of the axle housing 14 (non-steering axle), a midpoint M3 of the bar 30 is disposed approximate a midpoint M4 of the central axis of the axle housing 14, one can then mark a common distance on each exposed end 32 and 34 of the alignment bar 30 taken from each end of the axle housing 14, such as flanges F1 and F2 thereof thus identifying two geometrical equally displaced and symmetrical surface points about the midpoint M3 of the bar 30 to which alignment tool can be attached to each surface point. Now, employing a simple measuring tool, such as a measuring tape or measuring laser, one can measure from each mark M1 and M2 to a respective point, such A-frame mounting brackets 37, of front wheel base component 36.

Figure 4:
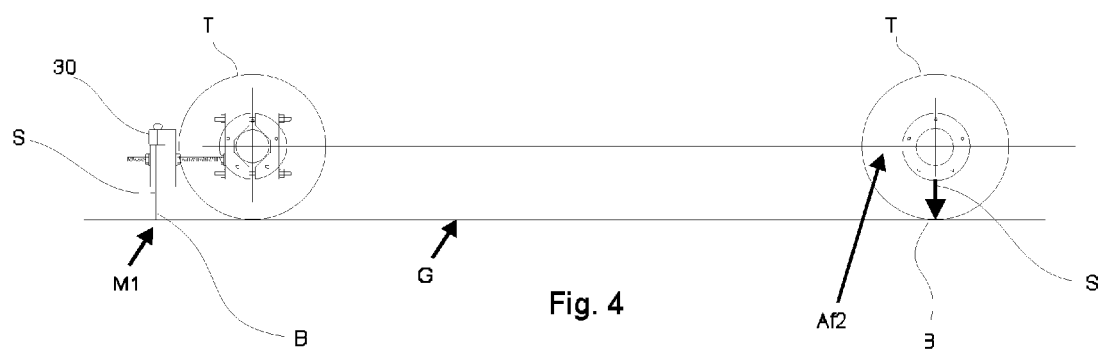
FIG. 4 is a side view of FIG. 3.

Each end 32 and 34 can be formed with a hole 38 and 40, respectively, through which a string S can be passed and attached to itself. A plumb bob B can be attached to an end of the string S as illustrated in FIG. 4. The bob B can be used to mark spots M1 and M2 on the ground G. These spots can be used to measure to corresponding opposing diagonal points AF1 and AF2 of A-frame mounting brackets 37 of the front wheel base component 36 in order to measure whether the wheelbase of the vehicle V is substantially square.

What is claimed is:

1. An alignment device for measuring wheel base on a vehicle having an axle, includes:
   at least one clamp removably clampable to the axle; and
   an alignment bar operably associated with said clamp in manner such that said alignment bar extends substantially in parallel alignment with a central axis of the axle, and when said alignment bar is connected to said clamp and said clamp is connected to the axle, said alignment bar includes a midpoint disposed approximate a midpoint of the central axis of the axle of the vehicle, and wherein said bar includes two geometrical equally displaced and symmetrical surface points about said midpoint of said bar to which an alignment tool can be attached to each surface point.

2. The alignment device of claim 1, wherein said alignment bar is of a length such that when connected to said clamp and said clamp is connected to the axle, said alignment bar is longer than a width of the vehicle.

3. The alignment device of claim 1, wherein said clamp includes a pair of members, each member having a pair of opposing faces which are angled with respect to one another to accommodate various sized axle radius.

4. The alignment device of claim 1, which includes a spacer bar connected to said clamp and a bracket connected to said spacer bar, said bracket connecting said alignment bar in a manner to maintain said alignment bar substantially in parallel alignment with said central axis of the axle.

5. The alignment device of claim 1, wherein said bracket is slidable adjustably fixably connected to said spacer bar.

6. The alignment device of claim 1, wherein said bracket is slidable adjustably fixably connected to said alignment bar.

7. The alignment device of claim 1, wherein said alignment bar surface points includes means for suspending a plumb bob therefrom.

8. The alignment device of claim 1, wherein said bracket is slidable adjustably fixably connected to one of said spacer bar and said alignment bar.

9. A method for measuring wheel base of a vehicle having an axle and an opposing wheelbase component, which includes the steps of:
   connecting a clamp to the axle;
   operably associating an alignment bar with said clamp in manner such that said alignment bar extends substantially in parallel alignment with a central axis of the axle, and when said alignment bar is connected to said clamp and said clamp is connected to the axle, said alignment bar includes a midpoint disposed approximate a midpoint of the central axis of the axle of the vehicle, and wherein said bar includes two geometrical equally displaced and symmetrical surface points about said midpoint of said bar to which an alignment tool can be attached to each surface point;
   and
   employing a measuring tool and measuring from each surface point to two respective end points of the opposing wheelbase component.

10. The method of claim 9, wherein said alignment bar is of a length such that when connected to said clamp and said clamp is connected to the axle, said alignment bar is longer than the width of the vehicle.

11. The method of claim 9, wherein said clamp includes a pair of members, each member having a pair of opposing faces which are angled with respect to one another to accept various sized radius.

12. The method of claim 9, which includes a spacer bar connected said clamp and a bracket connected to said clamp, said alignment bar connected to said bracket in a manner to maintain said alignment bar substantially in parallel alignment with the central axis of the axle.

13. The method of claim 9, wherein said bracket is slidable adjustably fixably connected to said spacer bar.

14. The method of claim 9, wherein said bracket is slidable adjustably fixably connected to said alignment bar.

15. The method of claim 9, wherein said alignment bar includes means for suspending a plumb bob from ends thereof and said plumb bob is suspended from said surface points on the alignment bar and each end point on the opposing wheelbase component in order to render a corresponding mark on a floor for each said mark and end point, and said measurement is taken using said corresponding marks.

16. The method of claim 15, wherein said measurement is taken diagonally between said corresponding mark and said opposing wheel base component.

17. An alignment device for measuring wheel base on a vehicle having an axle, includes:
   at least one clamp removably clampable to the axle; and
   an alignment bar operably associated with said clamp in manner such that said alignment bar extends substantially in parallel alignment with a central axis of the axle, wherein said alignment bar includes means for suspending a plumb bob therefrom.

18. The alignment device of claim 17, wherein said alignment bar is of a length such that when connected to said clamp and said clamp is connected to the axle, said alignment bar is longer than a width of the vehicle.

19. The alignment device of claim 17, wherein said clamp includes a pair of members, each member having a pair of opposing faces which are angled with respect to one another to accommodate various sized axle radius.

20. The alignment device of claim 17, which includes a spacer bar connected to said clamp and a bracket connected to said spacer bar, said bracket connecting said alignment bar in a manner to maintain said alignment bar substantially in parallel alignment with said central axis of the axle.

* * * * *